United States Patent
Chun

(10) Patent No.: US 9,100,224 B2
(45) Date of Patent: Aug. 4, 2015

(54) CALL PROCESSING METHOD AND APPARATUS IN VOIP SYSTEM

(75) Inventor: Joon-Sung Chun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1514 days.

(21) Appl. No.: 12/492,781

(22) Filed: Jun. 26, 2009

(65) Prior Publication Data

US 2010/0002684 A1      Jan. 7, 2010

(30) Foreign Application Priority Data

Jul. 1, 2008 (KR) .................. 10-2008-0063615

(51) Int. Cl.
*H04L 12/66* (2006.01)
*H04L 29/06* (2006.01)

(52) U.S. Cl.
CPC .......... *H04L 12/66* (2013.01); *H04L 29/06326* (2013.01)

(58) Field of Classification Search
None
See application file for complete search history.

(56) References Cited

U.S. PATENT DOCUMENTS

| | | | |
|---|---|---|---|
| 2003/0051173 A1* | 3/2003 | Krueger | 713/202 |
| 2004/0246946 A1* | 12/2004 | Nelson et al. | 370/352 |
| 2005/0180435 A1* | 8/2005 | Hsu | 370/401 |
| 2006/0034188 A1* | 2/2006 | Oran et al. | 370/254 |
| 2007/0019631 A1* | 1/2007 | Jang | 370/352 |
| 2007/0248098 A1* | 10/2007 | Chen | 370/395.2 |
| 2008/0043722 A1* | 2/2008 | Chuang et al. | 370/352 |
| 2008/0069327 A1* | 3/2008 | Kingsley et al. | 379/201.03 |
| 2008/0137643 A1* | 6/2008 | Khanchandani et al. | 370/352 |
| 2008/0148345 A1* | 6/2008 | Rubio | 726/1 |
| 2008/0247401 A1* | 10/2008 | Bhal et al. | 370/401 |
| 2008/0260137 A1* | 10/2008 | Poi et al. | 379/212.01 |
| 2008/0285545 A1* | 11/2008 | Diab et al. | 370/352 |
| 2009/0327426 A1* | 12/2009 | Ramanathan et al. | 709/205 |

* cited by examiner

*Primary Examiner* — Chirag Shah
*Assistant Examiner* — Amar Persaud
(74) *Attorney, Agent, or Firm* — The Farrell Law Firm, P.C.

(57) ABSTRACT

A Voice over Internet Protocol (VoIP) system includes at least one Internet Protocol (IP) terminal setting up a call through a switching system according to a signaling protocol, and at least one computer terminal capable of remotely accessing the IP terminal. The IP terminal sets up the call by exchanging a signaling message with a counterpart IP terminal when the computer terminal has remotely accessed the IP terminal, by transmitting a packet received through the call to the computer terminal, and by transmitting a packet received from the computer terminal to the counterpart IP terminal. A subscriber can receive and originate a call by accessing the subscriber's IP terminal irrespective of the subscriber's location.

19 Claims, 6 Drawing Sheets

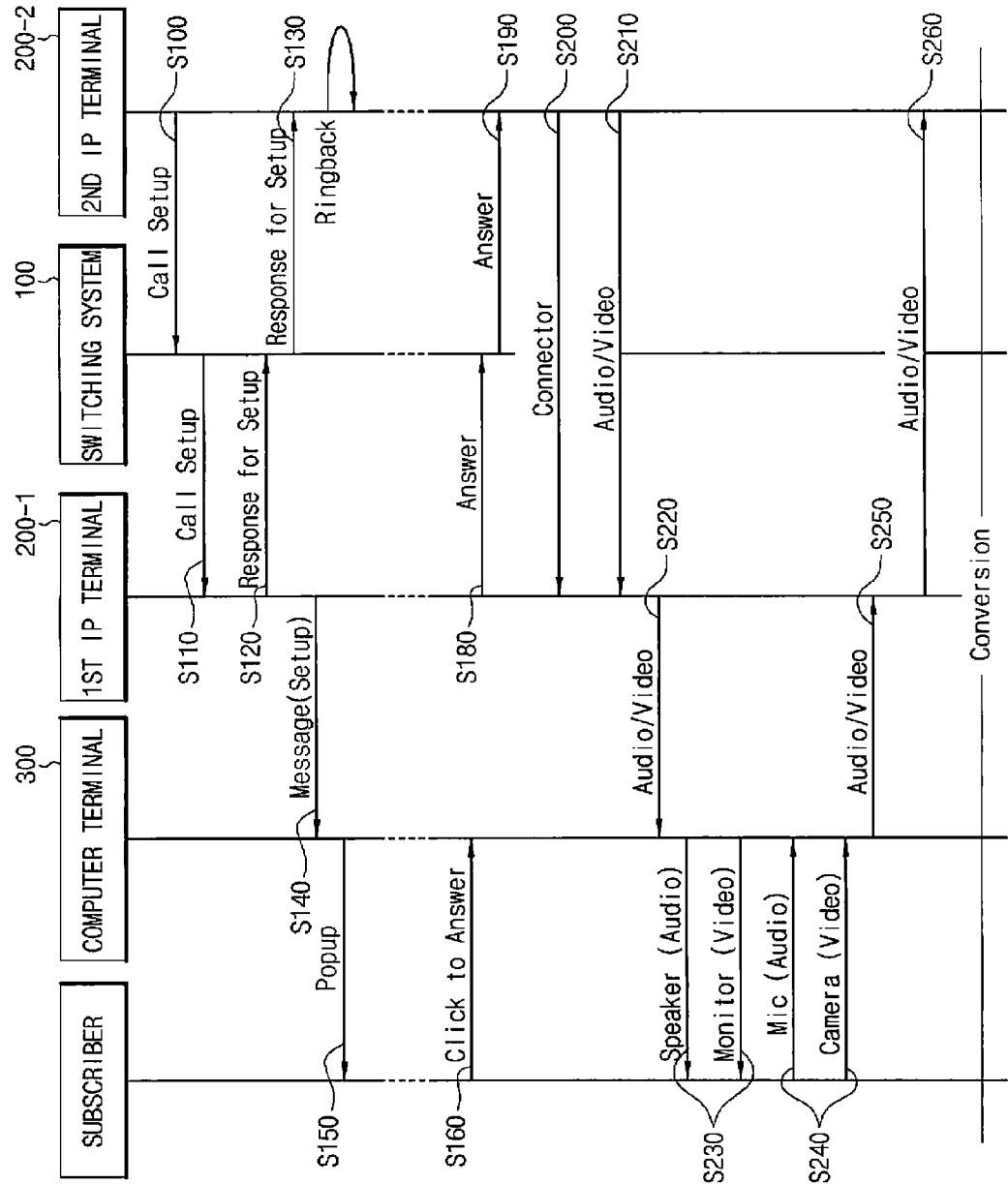

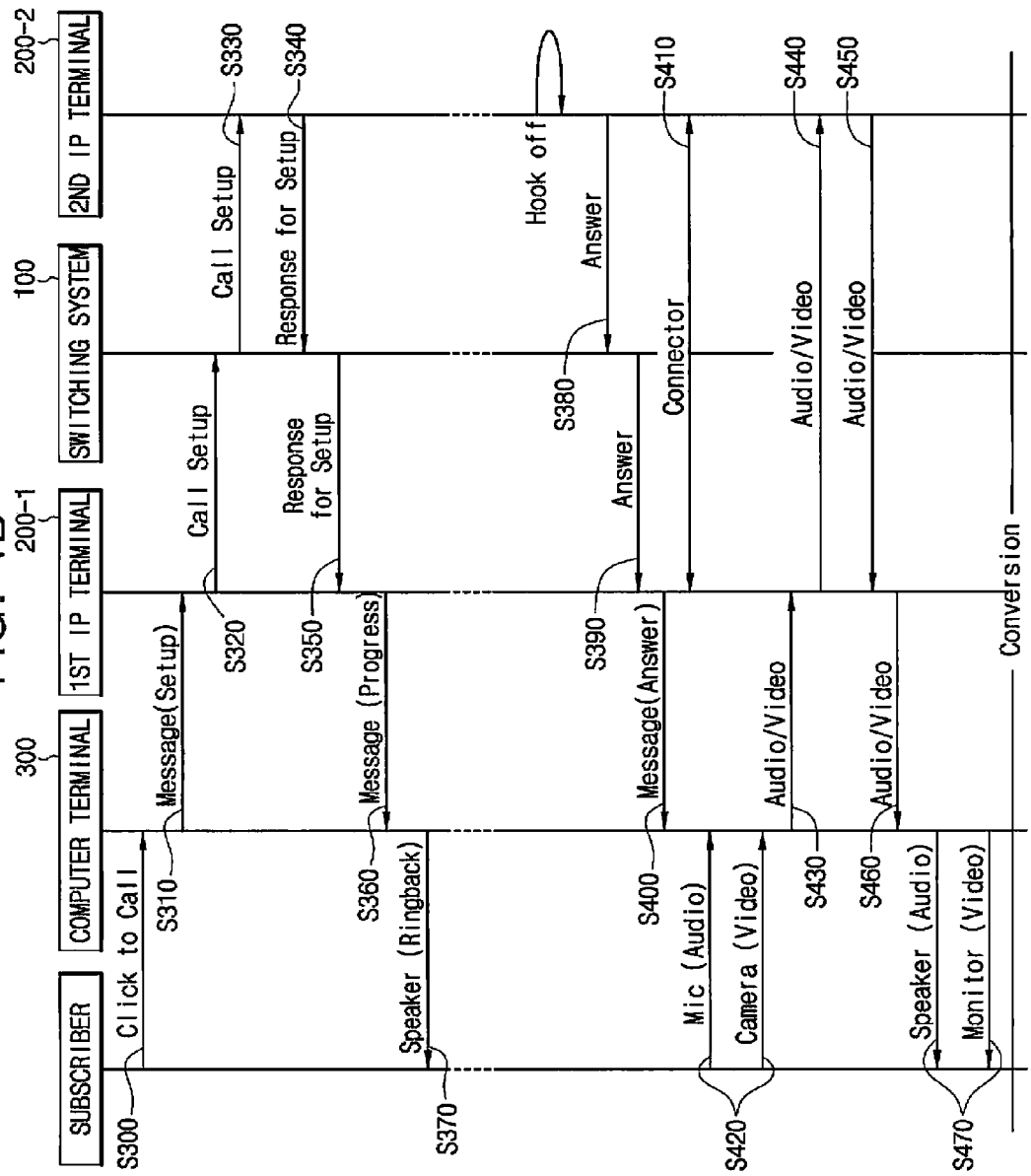

CALL PROCESSING METHOD AND APPARATUS IN VOIP SYSTEM

PRIORITY

This application claims priority under 35 U.S.C. §119 (a) to a Korean patent application filed in the Korean Intellectual Property Office on Jul. 1, 2008, and assigned Serial No. 2008-0063615, the contents of which are incorporated herein by reference.

BACKGROUND OF THE INVENTION

1. Field of the Invention

The present invention relates generally to a call processing method and apparatus in a Voice over Internet Protocol (VoIP) system, and more particularly, to one which can allow a subscriber to receive/originate a call by accessing the subscriber's Internet Protocol (IP) terminal irrespective of the subscriber's location.

2. Description of the Related Art

At present, a variety of services are being provided to subscribers through such networks as wired and wireless Internet networks due to developing network and electronic technologies. A representative service is a VoIP service that supports a telephone call, including images and sounds, over the Internet.

Compared to a conventional Public Switched Telephone Network (PSTN) service, the VoIP service has desirable features such as lower cost and various types of multimedia services.

Previously, the Internet was not regarded as being suitable for real-time information exchange such as a conventional voice call conversation through the PSTN since it is a packet network designed for transmitting and receiving data. That is, it was previously believed that real-time property could not be ensured during the transmission of a voice packet since the voice packet in the packet network can be damaged or delayed by other data packets.

However, when telephone service can be provided over the Internet network, i.e. the packet network, telephone charges may be cheaper than the PSTN service. Furthermore, a multimedia telephone service can be provided by simultaneously exchanging video and data based on the characteristics of the packet network. Accordingly, extensive research has been conducted on technologies that enable telephone service over the Internet, and a plurality of protocols for setting up a call over the Internet, such as H.323, Session Initiation Protocol (SIP) and Media Gateway Control Protocol (MGCP or MEGACO), and a packet-exchanging protocol, such as Real-time Transport Protocol (RTP), have been developed.

At present, a voice and video call service is being provided using a VoIP service between computers, a computer and an Internet Protocol (IP) terminal, and IP terminals, which can access the network based on such a protocol.

Due to the commercial launching of such VoIP services, a program capable of controlling the function of an IP terminal is installed in a computer, which is not configured to provide a VoIP service, so that the computer can be used as an auxiliary device of the IP terminal. For example, a computer can be used to control the IP terminal to originate or receive a call or to control some additional functions of the IP terminal for the sake of user convenience.

According to that conventional method, even though the computer can act as an auxiliary device to control the calling function of the IP terminal, the IP terminal is required to remain in a predetermined location since it performs the calling function. As a result, the location of the IP terminal and thus functions supported by the computer are compromised.

For example, when a VoIP service subscriber moves out of an area where the IP terminal is located, a VoIP service cannot be used. Neither may the subscriber answer an incoming call on the IP terminal or originate an outgoing call using the IP terminal. Therefore, the subscriber is subjected to an increasing burden of telephone charges.

SUMMARY OF THE INVENTION

The present invention has been made to solve the foregoing problems in the prior art, and an aspect of the present invention is to provide a call processing method and apparatus in a VoIP system, in which a subscriber can receive and originate a call by accessing an IP terminal at a remote location from an area where the IP terminal is located.

An aspect of the present invention is to provide a call processing method and apparatus in a VoIP system, in which the subscriber can set up an incoming call on an IP terminal or originate an outgoing call using the IP terminal at a remote location from an area where the IP terminal is located.

According to the present invention, the VoIP system includes at least one IP terminal setting up a call through a switching system according to a signaling protocol, and at least one computer terminal capable of remotely accessing the IP terminal. The IP terminal sets up the call by exchanging a signaling message with a counterpart IP terminal when the computer terminal has remotely accessed the IP terminal, by transmitting a packet received through the call to the computer terminal, and by transmitting a packet received from the computer terminal to the counterpart IP terminal.

The IP terminal stores authentication information of a subscriber, and perform authentication by comparing input information received from the computer terminal with the authentication information when remote access is requested from the computer terminal.

The computer terminal requests the IP terminal for remote access and transmits input information, which is inputted through an authentication pop-up window from the subscriber, to the IP terminal.

The IP terminal converts into relay mode when the computer terminal has remotely accessed the IP terminal, and transmits a first setup request message including originating information to the computer terminal, wherein a call setup request message received from the counterpart IP terminal includes the originating information.

The IP terminal transmits a response-for-setup message to the counterpart IP terminal when the call setup request message is received, and the computer terminal outputs setup request notification information including the originating information to a subscriber, wherein the originating information is included in the first setup request message.

The IP terminal transmits the call setup request message including destination information, to the counterpart IP terminal when a second setup request message including the destination information is received from the computer terminal, and transmits a ring-back message to the computer terminal when a response-for-setup message is received. The computer terminal outputs ring-back information included in the ring-back message, to the subscriber.

The IP terminal sets up the call by transmitting a call answer message to the counterpart IP terminal when an answer message is received from the computer terminal, and the computer terminal transmits a packet including audio or video data, to the counterpart IP terminal, and outputs audio or video data received from the counterpart IP terminal, to the subscriber.

According to the present invention, the IP terminal of the VoIP system includes a remote access manager for converting mode into relay mode by processing authentication when remote access is requested from a computer terminal over a network, a call-setting section for setting up a call by exchanging a signaling message with a counterpart IP terminal, and exchanging a message corresponding to the signaling message with the computer terminal, and a packet processor for transmitting a packet including audio or video data to the computer terminal, and transmitting a packet received from the computer terminal through the call.

The call-setting section transmits a response-for-setup message to the counterpart IP terminal and a first setup request message including originating information to the computer terminal when a call setup request message including the originating information is received from the counterpart IP terminal, and sets up the call by transmitting a call answer message to the counterpart IP terminal when an answer message is received.

The call-setting section transmits a call setup request message including destination information to the counterpart IP terminal when a second setup request message including the destination information is received from the computer terminal, and sets up the call with the counterpart IP terminal when a call answer message is received.

According to the present invention, the computer terminal of the VoIP system includes a remote connector for requesting remote access to a corresponding IP terminal over a network when the remote access is requested from a subscriber and for transmitting information inputted from the subscriber, to the IP terminal, a message processor, when the computer terminal has remotely-accessed the IP terminal, for outputting setup request notification information including originating information, included in a first setup request message received from the IP terminal, transmitting an answer message to the IP terminal when the subscriber answers the first setup request message, and transmitting a second setup request message, including destination information inputted from the subscriber, to the IP terminal, and a data processor for outputting audio or video data, included in a packet received from the IP terminal, and transmitting a packet, including audio or video data inputted from the subscriber, to the IP terminal.

According to the present invention, the call processing method in the VoIP system includes performing authentication, at an IP terminal, when remote access is requested from a computer terminal over a network, converting into relay mode when the authentication is completed, transmitting a first setup request message including originating information to the computer terminal when a call setup request message is received from a counterpart IP terminal over the network, transmitting a call answer message to the counterpart IP terminal and setting up a call when an answer message in response to the first setup request message is received from the computer terminal, transmitting a packet received through the call, to the computer terminal, and transmitting a packet, received from the computer terminal, to the counterpart IP terminal through the call.

The call processing method further includes transmitting a response-for-setup message to the counterpart IP terminal when the call setup request message is received.

The step of performing authentication includes requesting the computer terminal for input information when remote access is requested, and comparing the input information with previously stored authentication information.

The call processing method further includes outputting, at the computer terminal, setup request notification information including originating information when the first setup request message including the originating information is received, and transmitting, at the computer terminal, an answer message to the IP terminal when the subscriber answers the first setup request message.

According to the present invention, the call processing method in the VoIP system includes performing, at an IP terminal, authentication when remote access is requested from a computer terminal over a network, converting into relay mode when the authentication is completed, transmitting a call setup request message including originating information to a counterpart IP terminal, wherein the originating information is included in a second setup request message received from the computer terminals, transmitting an answer message to the computer terminal and setting up a call when a call answer message is received from the counterpart IP terminal, transmitting a packet, received through the call, to the computer terminal, and transmitting a packet, received from the computer terminal, to the counterpart IP terminal through the call.

The call processing method further includes transmitting a ring-back message including ring-back information to the computer terminal when a response-for-setup message is received from the counterpart IP terminal.

According to the present invention, the call processing method in the VoIP system includes requesting, at a computer terminal, an IP terminal for remote access over a network in response to a request from a subscriber, outputting setup request notification information including originating information, which is included in a first setup request message received from the IP terminal, transmitting an answer message to the IP terminal when the subscriber answers the first setup request message, transmitting a packet including audio or video data, input from the subscriber, to the IP terminal, and outputting audio or video data included in a packet received via the IP terminal from a counterpart IP terminal, which corresponds to the originating information.

The call processing method further includes transmitting a second setup request message, including destination information inputted from the subscriber, to the IP terminal, and outputting ring-back information included in a ring-back message received from the IP terminal.

The call processing method further includes outputting an authentication pop-up window when information input is requested from the IP terminal, and transmitting information, which is input from the subscriber using the authentication pop-up window, to the IP terminal to enable authentication.

According to the present invention, a VoIP service is provided through the IP terminal using the computer terminal, which the subscriber has used for only an auxiliary purpose.

Since the subscriber can process an incoming call on the subscriber's IP terminal and originate a call using the IP terminal irrespective of his/her location, the subscriber can realize reduced telephone charges.

For example, the subscriber can receive an incoming call on the IP terminal or originate a call using the IP terminal at a remote location out of an office where the IP terminal is placed. Accordingly, the subscriber at the remote location can have a telephone call in the same manner as in the office, and perform a voice and video call using the IP terminal.

BRIEF DESCRIPTION OF THE DRAWINGS

The above and other aspects, features and other advantages of preferred embodiments of the present invention will be more apparent from the detailed description taken in conjunction with the accompanying drawings, in which:

FIG. 4A illustrates a first embodiment of a call processing method of a VoIP system in accordance with the present invention;

FIG. 4B illustrates a second embodiment of a call processing method of a VoIP system in accordance with the present invention.

DETAILED DESCRIPTION OF THE PREFERRED EMBODIMENTS

The present invention will now be described more fully hereinafter with reference to the accompanying drawings, in which preferred embodiments of a call processing method and apparatus in a VoIP system are shown. In the following description, a detailed description of known functions and components incorporated herein will be omitted for the sake of clarity and conciseness.

Figure 1:
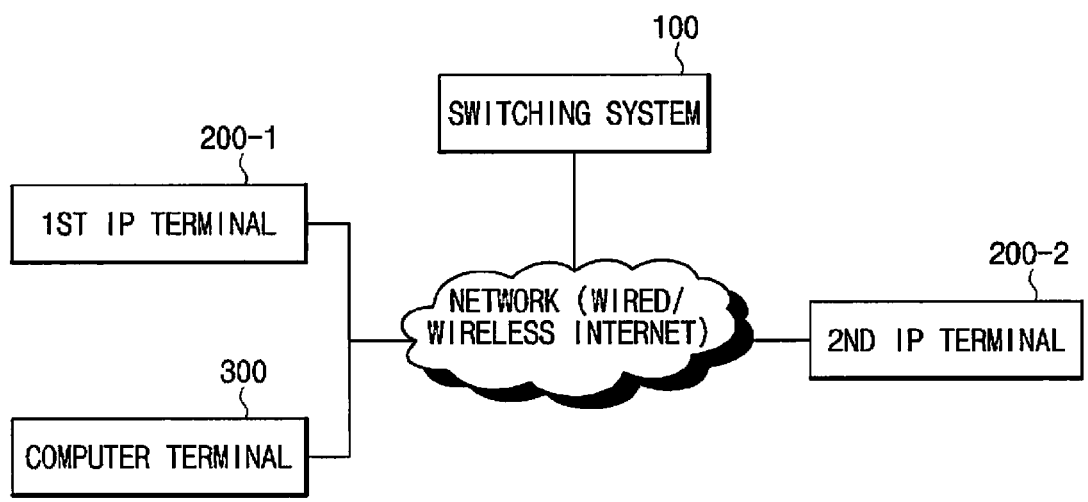
FIG. 1 illustrates a VoIP system in accordance with the present invention.

FIG. 1 illustrates a VoIP system in accordance with the present invention.

Referring to FIG. 1, the VoIP system includes a plurality of IP terminals 200-1 and 200-2, a computer terminal 300 and a switch system 300 connected over a network.

The switching system relays a signaling message to an originating or receiving part such as a Private Branch eXchange (PBX) or a key phone. The signaling message is used to set up a call for providing a VoIP service such as an audio and video call service.

For example, the switching system 100 functions as a soft switch, relays a signaling message between originating and receiving parts, in which the signaling message is used for setting, changing and disconnecting a call between VoIP gateways, which are accessed by a plurality of the IP terminals 200-1 and 200-2 or telephone terminals access. The switching system 100 also interfaces with an application server such as a separate charging server, a Short Message Service (SMS) server and a Multimedia Messaging Service (MMS) server.

An IP terminal 200-1 or 200-2 (or a computer terminal 300 realizing a VoIP service function) sets up a call for providing a VoIP service over the network and exchanges a packet (corresponding to audio and video information inputted from subscribers) through the call.

In other words, the IP terminal 200-1 or 200-2 sets up a call by exchanging a signaling message with a counterpart through the switching system 100, generates a packet including audio and video information of the subscriber, and outputs sounds and images of the subscriber while transmitting the audio and video information through the call.

For example, the IP terminal 200-1 sets up a call by exchanging a signaling message with the counterpart IP terminal 200-2 in normal mode. In relay mode, when a signaling message such as a call setup request message is received, the IP terminal 200-1 transmits a call answer message to the counterpart IP terminal 200-2 and a setup request message to the computer terminal 300 connected over the network. When a call answer message in response to a call setup request message is received, the IP terminal 200-1 transmits an answer message to the computer terminal 300.

In addition, when a call with the counterpart IP terminal 200-2 is set up in relay mode, the IP terminal 200-1 transmits a packet including audio or video information, received from the counterpart IP terminal 200-2, to the computer terminal 300, and a packet received from the computer terminal 300 to the counterpart IP terminal 200-2. In other words, the IP terminal 200-1 relays the packets between the computer terminal 300 and the counterpart IP terminal 200-2.

The computer terminal 300 accesses, for example, the IP terminal 200-1 over the network in response to the request from the subscriber, and transmits a setup request message to the IP terminal 200-1. The setup request message includes address information of the IP terminal 200-1, inputted by the subscriber.

When the setup request message is received in relay mode where the computer terminal 300 is connected, the IP terminal 200-1 sets address information of the IP terminal 200-1, included in the setup request message, as destination address information and then transmits a call setup request message to the switching system 100.

The switching system 100 transmits the call setup request message according to the destination address information included in the call setup request message.

When the call setup request message is received, the IP terminal 200-1 checks the mode. If the mode is relay mode, the IP terminal 200-1 transmits a call answer message in response to the call setup request message to the counterpart IP terminal 200-2 through the switching system 100, and transmits a setup request message, including originating address information, to the computer terminal 300.

In addition, when the call answer message is received, the IP terminal 200-2 checks the mode. If the mode is relay mode, the IP terminal 200-2 transmits an answer message, including ring-back information, to the computer terminal 300.

Figure 2:
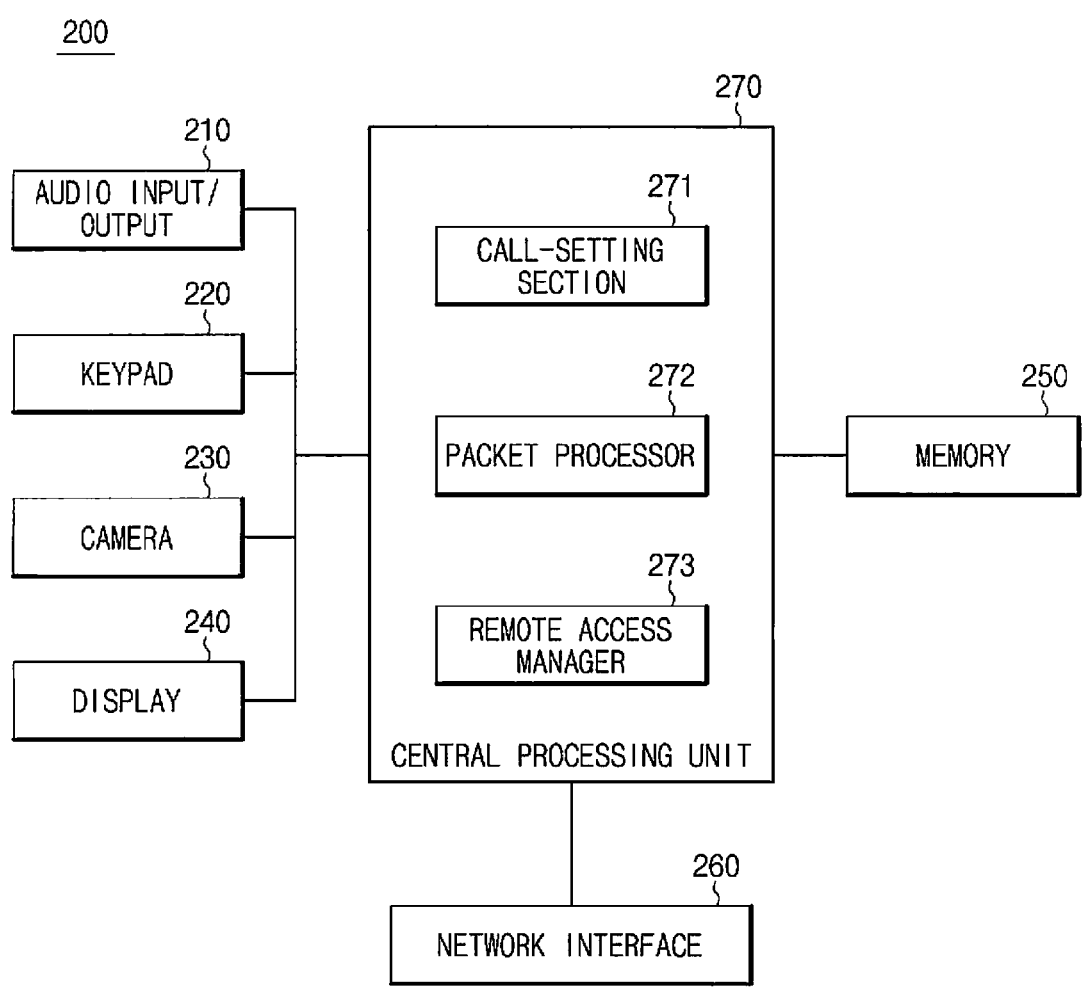
FIG. 2 illustrates an IP terminal in accordance with the present invention.

FIG. 2 illustrates an IP terminal 200 in accordance with the present invention.

Referring to FIG. 2, the IP terminal 200 includes an audio input/output 210, a keypad 220, a camera 230, a display 240, a network interface 260, a memory 250 and a central processing unit. The central processing unit includes a call-setting section 271, a packet processor 272 and a remote access manager 273.

The audio input/output 210 corresponds to a handset of a common telephone terminal. The audio input/output 210 provides audio data using voice information input from the subscriber and outputs voice information from the counterpart subscriber.

The keypad 220 is configured with a plurality of keys or a touch screen, which allows the subscriber to make a call setup request by inputting destination address information or to answer an incoming call setup request received from the counterpart IP terminal.

The camera 230 provides video data by taking an image of the subscriber when the VoIP system is providing a video call service.

The display 240 outputs video data, i.e., an image of the counterpart subscriber received from the counterpart IP terminal.

The network interface 260 allows the IP terminal 200 to access the switching system 100 and the counterpart IP terminal, or to access the computer terminal 300.

The memory 250 stores such information as an operating program of the IP terminal 200, subscriber information and call history information.

The subscriber information corresponds to authentication information and personal information of the subscriber using the IP terminal 200 when the subscriber accesses the computer terminal 300 at a remote location. The authentication information can be identification (ID) and password.

The central processing unit transmits a call setup request message to the counterpart IP terminal having the destination address information through the switching system when the subscriber makes a call setup request using the keypad 220, and sets up a call when a call answer message is received. Then, the central processing unit transmits a packet through the call to the counterpart IP terminal. The packet includes audio data inputted through the audio input/output 210 and video data inputted from the camera 230.

When a call setup request message is received, the central processing unit transmits the call answer message to the counterpart IP terminal. When the call is set up, the central processing unit transfers audio data in the packet, received from the counterpart IP terminal, to the audio input/output 210 and video data to the display 240.

When the call setup request is received from the subscriber, the call-setting section 271 of the central processing unit transmits an invite message to the switching system according to the destination address information if the call setup request message such as a signaling protocol, is a Session Initiation Protocol (SIP). When a 200 OK message is received from the destination IP terminal, the central processing unit sets up the call.

Below, a description will be given of the case where the signaling protocol is the SIP. It should be understood, however, that the same explanation can be applied to other types of protocol.

That is, the call-setting section 271 sets up the call by exchanging the signaling message with the counterpart IP terminal according to the signaling protocol.

The packet processor 272 exchanges a packet, such as a Real-time Transport Protocol (RTP) packet, including audio and video data through the call set up by the call-setting section 271. In other words, the packet processor 272 generates a packet including audio and video data, transmits the packet through the call, and outputs the audio and video data of the packet, received from the counterpart IP terminal, by transferring the data to the audio input/output 210 and the display 240.

The remote access manager 273 manages the remote access of the subscriber and the mode of the terminal, such as normal mode and relay mode.

When the subscriber performs remote access using the computer terminal 300, the remote access manager 273 performs an authentication process based on authentication information stored in the memory 250, and converts to relay mode after the authentication is completed.

In relay mode, due to the remote access by the subscriber through the remote access manager 273, when a call setup request message such as an invite message is received through the switching system 100, the call-setting section 271 transmits a response-for-setup message such as a 180 ringing message, to the counterpart IP terminal and a first setup request message to the remotely-accessed computer terminal 300. The first setup request message includes the originating address information that is included in the call setup request message.

In addition, when an answer message from the computer terminal 300 is received, the call-setting section 271 sets up the call by transmitting a call answer message, such as a 200 OK message, to the originating IP terminal 200.

When a second setup request message including destination address information is received from the computer terminal 300, the call-setting section 271 transmits a call setup request message, including the destination address information as destination information, to the destination IP terminal through the switching system 100.

In addition, when a response-for-setup message is received from the destination IP terminal 200, the call-setting section 271 transmits a ring-back message including ring-back information to the computer terminal 300. When a call answer message is received, the call-setting section 271 sets up a call with the destination IP terminal 200.

When a call is set up in relay mode, the packet processor 272 relays a packet exchanged through the call to the computer terminal 300. Specifically, the packet processor 272 transmits audio and video data of the packet, received through the call, to the computer terminal 300 while transmitting a packet including audio and video data, received from the computer terminal 300, to the counterpart IP terminal.

Figure 3:
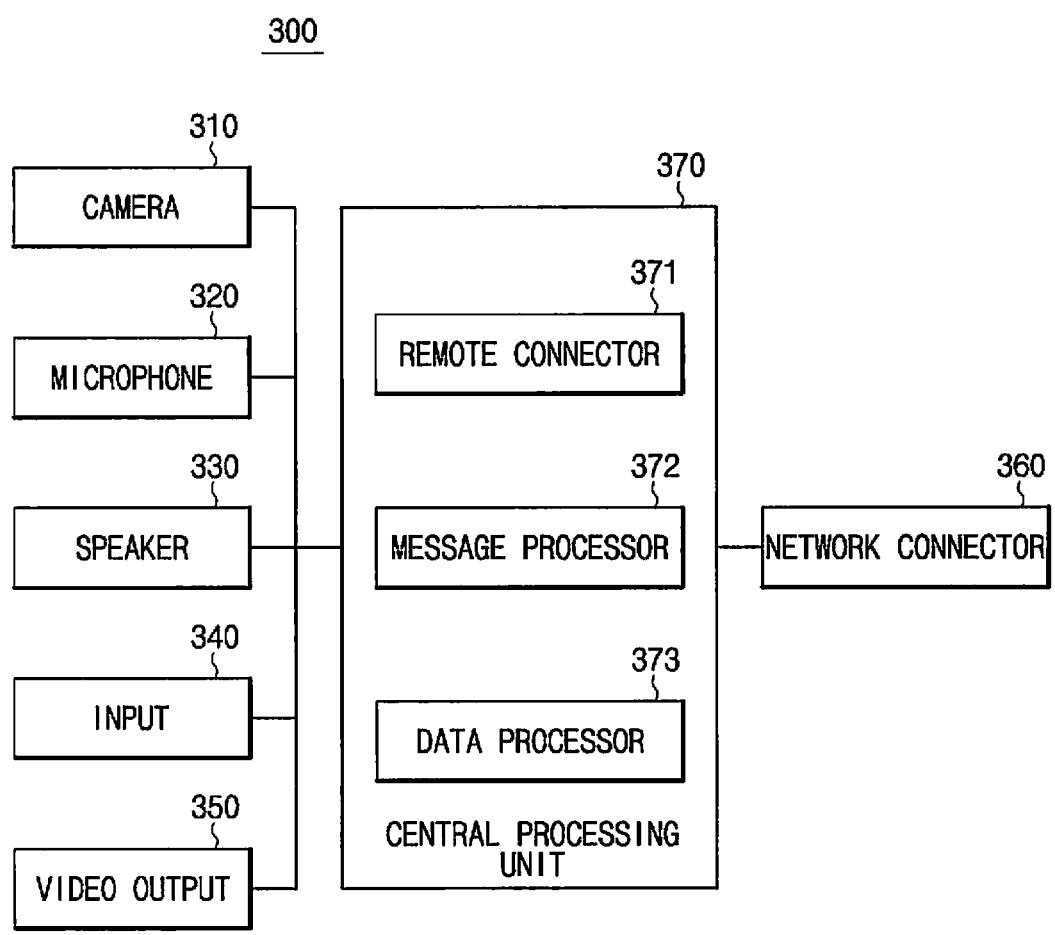
FIG. 3 illustrates a computer terminal in accordance with the present invention.

FIG. 3 illustrates a computer terminal 300 in accordance with the present invention.

Referring to FIG. 3, the computer terminal 300 includes a camera 310, a microphone 320, a speaker 330, an input 340, a video output, a network connector 360, and a central processing unit 370, which is the same as the central processing unit 270. The camera 310 provides video data by photographing the image of the subscriber, the microphone 320 provides audio data using audio inputted from the subscriber, and the speaker 330 outputs voice information. The input 340 is configured with a keyboard or a mouse for allowing the subscriber to input information, and the video output 350 is configured with, for example, a monitor for outputting video information.

The network connector 360 is configured with, for example, a Local Area Network (LAN) card, which allows the terminal to access the network. The central processing unit 370 allows the subscriber to access the IP terminal 200 at a remote location, and to set up a call through the IP terminal 200 so that the subscriber can be provided with VoIP service. The central processing unit 370 includes a remote connector 371 for allowing the subscriber to perform remote access, a message processor 372 for processing a message exchanged between the computer terminal 300 and the IP terminal 200, and a data processor 373 for exchanging audio and video data with the IP terminal 200.

The remote connector 371, the message processor 372 and the data processor 373 may be installed in the central processing unit 370 as application programs, or may be separately configured.

In the following description of the present invention, well-known components of the computer terminal 300 will not be described in detail for the sake of clarity and conciseness.

When the subscriber requests remote access to the IP terminal 200 through the input 340, the remote connector 371 remotely accesses the IP terminal 200 through the network connector 360.

For example, when the subscriber inputs the IP address of the IP terminal 200, the remote connector 371 accesses the IP terminal 200 and outputs an authentication pop-up window on the video output 350 so that the remote access manager 273 of the IP terminal 200 can perform an authentication process.

Specifically, the remote access manager 273 of the IP terminal 200 requests authentication information to perform the authentication process in response to remote access of the computer terminal 300. When a request for authentication information from the IP terminal 200 is received, the remote connector 371 outputs the authentication pop-up window on the video output 350 so that the subscriber can input the authentication information, and when the subscriber inputs the authentication information on the authentication pop-up window using the input 340, transmits the input authentication information to the remote access manager 273.

Then, the remote access manager 273 of the IP terminal 200 performs authentication by comparing the input authentication information from the computer terminal 300 with authentication information stored in the memory 250.

After the authentication is completed, the remote connector 371 remotely sets up a call through the IP terminal 200, thereby converting into remote access mode so that a VoIP service can be provided.

When converted into remote access mode or in the remotely-accessed state, when a first setup request message, including destination address information, is received from the IP terminal 200, the message processor 372 outputs notification information on a pop-up window or a voice signal to notify that a call has been requested on the IP terminal 200 of the subscriber.

When the subscriber answers the call setup request using the input 340, the message processor 372 transmits an answer message to the IP terminal 200.

In remote access mode, when the subscriber makes a call setup request by inputting destination address information using the input 340, the message processor 372 transmits a second setup message to the IP terminal 200.

In remote access mode, the data processor 373 outputs audio data received from the IP terminal 200 by transferring the audio data to the speaker 330, and outputs video data by transferring the video data to the video display 350.

The data processor 373 transmits audio data received through the microphone 320 and video data received from the camera 310 to the IP terminal 200.

Therefore, the subscriber can set up an incoming call on the IP terminal 200 or originate a call with the IP terminal 200 using the computer terminal 300 at a remote location, and can realize VoIP service through the call set up using the IP terminal 200.

FIG. 4A illustrates a first embodiment of a call processing method of the VoIP system in accordance with the present invention, and describes processing of an incoming call on the IP terminal 200-1 using the computer terminal 300 at a remote location. Referring to FIG. 4A, the second IP terminal 200-2 transmits a call setup request message to the switching system 100 in response to a request from the subscriber in S100. The call setup request message includes IP address information of the first IP terminal 200-1 as destination address information.

The switching system 100 transmits a call setup request message to the second IP terminal 200-2 by detecting destination address information of the call setup request message in S110.

Due to a relay mode in which the computer terminal 300 has remotely accessed the IP terminal 200-1, when the call setup request message is received, the first IP terminal 200-1 transmits a response-for-setup message to the second IP terminal 200-2 through the switching system 100 in S120 and S130.

When the response-for-setup message is received, the second IP terminal 200-2 notifies the response-for-setup to the subscriber by outputting ring-back information.

Then, the first IP terminal 200-1 transmits a first setup request message including originating address information of the call setup request message to the computer terminal 300 in S140. When the first setup request message is received, the computer terminal 300 outputs telephone call setup request notification information to the subscriber in S150. In this case, the computer terminal 300 can output the telephone call setup request notification information on a pop-up window or a voice signal.

When the subscriber checks the telephone call setup request notification information and answers, for example, by clicking an answer button on the pop-up window in S160, the computer terminal 300 transmits an answer message to the first IP terminal 200-1 in S170.

When the answer message is received from the computer terminal 300, the first terminal 200-1 transmits a call answer message to the second IP terminal 200-2 through the switching system 100 in S180 and S190.

Then, the first IP terminal 200-1 and the second IP terminal 200-2 set up a call in S200.

When the call is set up, the second IP terminal 200-2 transmits a packet including audio and video data through the call to the first IP terminal 200-1 in S210, and the first IP terminal 200-1 transmits (i.e., relays) the packet received on the telephone call to the computer terminal in S220.

The computer terminal 300 outputs the audio and video data, included in the packet received from the first IP terminal 200-1, on the speaker 330 and the video output 350 in S230.

In addition, the computer terminal 300 receives audio data from the subscriber using the microphone 320 and video data using the camera 310 in S240, and transmits a packet including the audio and video data to the first IP terminal 200-1 in S250.

The first IP terminal 200-1 transmits the packet, received from the computer terminal 300, on the telephone call to the second IP terminal 200-2 in S260, and the second IP terminal 200-2 outputs the audio and video data included in the packet.

FIG. 4B illustrates a second embodiment of a call processing method of the VoIP system in accordance with the present invention, and describes a case where the computer terminal 300 makes a call setup request through the IP terminal 200, which the computer terminal 300 has remotely accessed. Referring to FIG. 4B, when the subscriber generates a call setup request by inputting destination address information on the input 340 in S300, the computer terminal 300 transmits a second setup request message including the destination address information to the first IP terminal 200-1 in S310.

The first IP terminal 200-1 transmits a call setup request message to the second IP terminal 200-2 through the switching system 100 in S320 and S330. In this case, the call setup request message includes the destination address information of the second setup request message as destination information.

When the call setup request message is received, the second IP terminal 200-2 transmits a response-for-setup message to the first IP terminal 200-1 through the switching system 100 in S340 and S350.

When the response-for-setup message is received, the first IP terminal 200-1 transmits a ring-back message (i.e., a progress message) including ring-back information to the computer terminal 300 in S360, and the computer terminal 300 outputs the ring-back information from the ring-back message in S370.

When the subscriber answers an incoming call (Hook off), the second IP terminal 200-2 transmits a call answer message to the first IP terminal 200-1 through the switching system 100 in S380 and S390.

When the call answer message is received, the first IP terminal 200-1 transmits an answer message to the computer terminal 300 in S400, and sets up a call with the second IP terminal 200-2 in S410.

After the call is set up, the computer terminal 300 receives audio data from the subscriber using the microphone 320 and video data using the camera 310 in S420, and transmits a packet including the audio and video data to the first IP terminal 200-1 in S430.

The first IP terminal 200-1 transmits the packet, received from the computer terminal 300, through the call to the second IP terminal 200-2 in S440, and the second IP terminal 200-2 outputs the audio and video data from the packet.

When the call is set up, the second IP terminal 200-2 transmits a packet including audio and video data through the call to the first IP terminal 200-1 in S450, and the first IP terminal 200-1 transmits (i.e., relays) the packet received through the call to the computer terminal 300 in S460.

The computer terminal 300 outputs the audio and video data, included in the packet received from the first IP terminal 200-1, on the speaker 330 and the video output 350 in S470.

Figure 5:
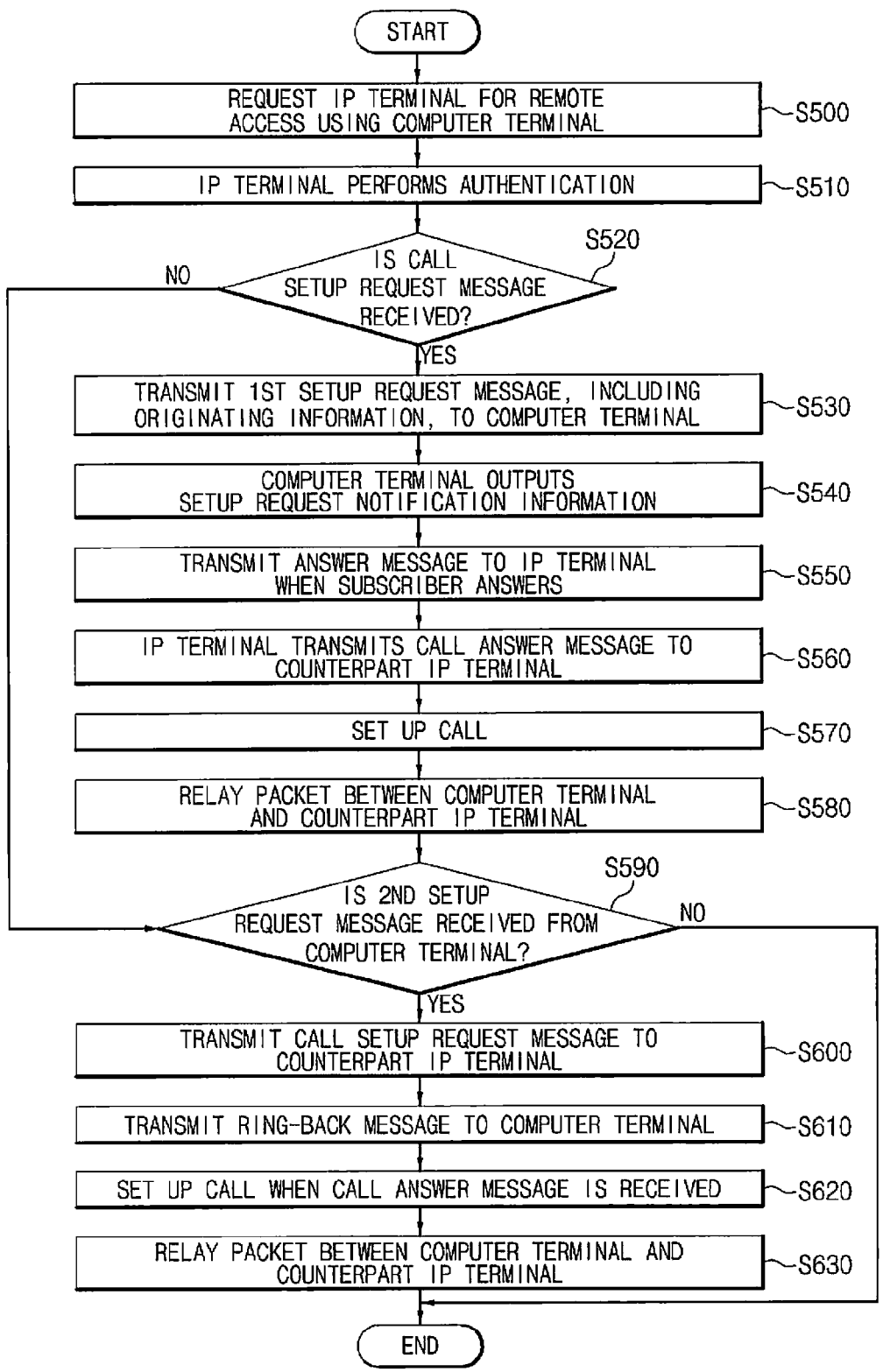
FIG. 5 illustrates a call processing method of a VoIP system in accordance with the present invention.

FIG. 5 illustrates a call processing method of a VoIP system in accordance with the present invention. Referring to FIG. 5, the subscriber requests in S500 a remote access using the computer terminal 300 from a remote location where the IP terminal 200-1 is not located. In this case, the subscriber can request the remote access using IP address information of the IP terminal 200-1. When the remote access is requested, the IP terminal 200-1 performs an authentication process in S510.

Specifically, the IP terminal 200-1 requests, in response to the remote access request, the computer terminal 300 to input authentication information. The computer terminal 300 outputs an authentication pop-up window requesting the subscriber to input the authentication information, and transmits the authentication information, input from the subscriber, to the IP terminal 200-1.

Then, the IP terminal 200-1 performs the authentication process by comparing the received authentication information with previously-stored authentication information.

After the authentication process is completed, the IP terminal 200-1 converts into relay mode, and determines whether a call setup message is received through the switching system 100 in S520.

When the call setup request message is received, the IP terminal 200 transmits a response-for-setup message to the counterpart IP terminal 200-2 according to destination address information of the call setup request message, and a first setup request message including originating address information to the computer terminal 300 in S530. When the call setup request message is not received, the process proceeds to S590, which will be discussed below.

The computer terminal 300 outputs setup request notification information to the subscriber in S540. The setup request notification information includes the originating address information, which is included in the first setup request message. When the subscriber answers the setup request, the computer terminal 300 transmits an answer message to the IP terminal 200-1 in S550.

When the answer message is received from the computer terminal 300, the IP terminal 200-1 transmits a call answer message to the counterpart IP terminal 200-2 through the switching system 100 in S560, and establishes a call in S570.

The IP terminal 200-1 transmits audio and video data included in a packet received from the counterpart IP terminal 200-2 to the computer terminal 300 and a packet including audio and video data received from the computer terminal 300 to the counterpart IP terminal 200-2 in S580. In other words, the IP terminal 200-1 relays a packet from the counterpart IP terminal 200-2 to the computer terminal 300 while transmitting a packet from the computer terminal 300 to the counterpart IP terminal 200-2.

Afterwards, the IP terminal 200-1 determines whether a second setup request message including destination address information is received from the computer terminal 300 in S590.

When it is determined that the second setup request message is received from the computer terminal 300, the IP terminal transmits a call setup request message, in which the destination address information included in the second setup request message is set as destination information, to the counterpart IP terminal 200 through the switching system 100 in S600. When it is determined that the second setup request message is not received from the computer terminal 300, the process ends.

When a response-for-setup message is received from the counterpart IP terminal 200-2, the IP terminal 200-1 transmits a ring-back message including ring-back information to the computer terminal 300 in S610. When a call answer message is received, the IP terminal 200-1 sets up a call with the counterpart IP terminal 200 in S620.

The IP terminal 200-1 transmits audio and video data included in a packet received from the counterpart IP terminal 200 through the call to the computer terminal 300 and a packet including audio and video data received from the computer terminal 300 to the counterpart IP terminal 200 in S630. In other words, the IP terminal 200-1 relays the packet received from the counterpart IP terminal 200-2 to the computer terminal 300 while relaying the packet received from the computer terminal 300 to the counterpart IP terminal 200.

While the present invention has been shown and described with reference to preferred embodiments thereof, it will be understood by those skilled in the art that various changes in form and details may be made therein without departing from the spirit and scope of the present invention as defined by the appended claims and their equivalents.

What is claimed is:

1. A Voice over Internet Protocol (VoIP) system comprising:
at least one Internet Protocol (IP) terminal for setting up a call between the IP terminal and a counterpart IP terminal through a switching system according to a signaling protocol, such that the IP terminal is set up as one of an originating terminal of the call and a destination terminal of the call and the counterpart IP terminal is set up as another one of the originating terminal of the call and the destination terminal of the call; and
at least one computer terminal configured to remotely access the IP terminal,
wherein the IP terminal sets up the call between the IP terminal and the counterpart IP terminal by exchanging a signaling message with the counterpart IP terminal when the computer terminal has remotely accessed the IP terminal, by transmitting a packet received through the call to the computer terminal, and by transmitting a packet received from the computer terminal to the counterpart IP terminal, and
wherein the IP terminal stores authentication information of a subscriber, and performs authentication by comparing input information received from the computer terminal with the authentication information when remote access is requested from the computer terminal,
wherein the IP terminal converts into relay mode when the computer terminal has remotely accessed the IP terminal, and transmits a first setup request message including originating information to the computer terminal,
wherein a call setup request message received from the counterpart IP terminal includes the originating information, and
wherein the IP terminal transmits a response-for-setup message to the counterpart IP terminal when the call setup request message is received.

2. The VoIP system of claim of claim 1, wherein the computer terminal requests the IP terminal for remote access and transmits input information, which is inputted through an authentication pop-up window from the subscriber, to the IP terminal.

3. The VoIP system of claim 1, wherein the computer terminal outputs setup request notification information including the originating information to a subscriber, wherein the originating information is included in the first setup request message.

4. The VoIP system of claim 1, wherein the IP terminal transmits the call setup request message, including destination information, to the counterpart IP terminal when a second setup request message, including the destination information, is received from the computer terminal, and transmits a ring-back message to the computer terminal when a response-for-setup message is received.

5. The VoIP system of claim 4, wherein the computer terminal outputs ring-back information, included in the ring-back message, to the subscriber.

6. The VoIP system of claim 4, wherein the IP terminal sets up the call by transmitting a call answer message to the counterpart IP terminal when an answer message is received from the computer terminal.

7. The VoIP system of claim 1, wherein the computer terminal transmits a packet, including audio or video data, to the counterpart IP terminal, and outputs audio or video data, received from the counterpart IP terminal, to the subscriber.

8. An Internet Protocol (IP) terminal of a Voice over Internet Protocol (VoIP) system, comprising:
   a remote access manager for converting a mode into relay mode by processing authentication when remote access is requested from a computer terminal over a network;
   a call-setting section, when the mode is converted into the relay mode, for setting up a call between the IP terminal and a counterpart IP terminal by exchanging a signaling message with the counterpart IP terminal, and exchanging a message corresponding to the signaling message with the computer terminal, such that the IP terminal is set up as one of an originating terminal of the call and a destination terminal of the call and the counterpart IP terminal is set up as another one of the originating terminal of the call and the destination terminal of the call; and
   a packet processor for transmitting a packet including audio or video data, received through the call, to the computer terminal, and transmitting a packet received from the computer terminal through the call,
   wherein the call-setting section transmits a response-for-setup message to the counterpart IP terminal and a first setup request message including originating information to the computer terminal when a call setup request message including the originating information is received from the counterpart IP terminal, and sets UP the call by transmitting a call answer message to the counterpart IP terminal when an answer message is received.

9. The IP terminal of claim 8, wherein the call-setting section transmits a call setup request message including destination information to the counterpart IP terminal when a second setup request message including the destination information is received from the computer terminal, and sets up the call with the counterpart IP terminal when a call answer message is received.

10. A computer terminal of a Voice over Internet Protocol (VoIP) system, comprising:
   a remote connector for requesting remote access to a corresponding IP terminal over a network when the remote access is requested from a subscriber and transmitting information, inputted from the subscriber, to the IP terminal;
   a message processor, in a state where the computer terminal has remotely-accessed the IP terminal, for outputting setup request notification information including originating information, included in a first setup request message received from the IP terminal, transmitting an answer message to the IP terminal when the subscriber answers the first setup request message, and transmitting a second setup request message configured for setting up a call between the IP terminal and a counterpart IP terminal, including destination information of the counterpart IP terminal inputted from the subscriber, to the IP terminal, such that the IP terminal is set up as one of an originating terminal of the call and a destination terminal of the call and the counterpart IP terminal is set up as another one of the originating terminal of the call and the destination terminal of the call; and
   a data processor for outputting audio or video data, included in a packet received from the IP terminal, and transmitting a packet, including audio or video data inputted from the subscriber, to the IP terminal,
   wherein the IP terminal converts into relay mode when the computer terminal has remotely accessed the IP terminal,
   wherein a call setup request message received by the IP terminal from the counterpart IP terminal includes the originating information, and
   wherein the IP terminal transmits a response-for-setup message to the counterpart IP terminal when the call setup request message is received.

11. A call processing method in a Voice over Internet Protocol (VoIP) system performed by an Internet Protocol (IP) terminal, comprising:
   performing authentication when remote access is requested from a computer terminal over a network;
   converting into relay mode when the authentication is completed and the computer terminal has remotely accessed the IP terminal;
   transmitting, when a call setup request message for setting up a call between the IP terminal and a counterpart IP terminal is received from the counterpart IP terminal over the network, a first setup request message including originating information to the computer terminal, such that the IP terminal is set up as one of an originating terminal of the call and a destination terminal of the call and the counterpart IP terminal is set up as another one of the originating terminal of the call and the destination terminal of the call;
   transmitting a call answer message to the counterpart IP terminal and setting up a call when an answer message in response to the first setup request message is received from the computer terminal;
   transmitting a packet, received through the call, to the computer terminal; and
   transmitting a packet, received from the computer terminal, to the counterpart IP terminal through the call,
   wherein the call setup request message received from the counterpart IP terminal includes the originating information, and
   wherein the IP terminal transmits a response-for-setup message to the counterpart IP terminal when the call setup request message is received.

12. The call processing method of claim 11, wherein performing authentication comprises:
  requesting the computer terminal for input information when the remote access is requested, and
  comparing the input information with previously-stored authentication information.

13. The call processing method of claim 11, further comprising:
  outputting, at the computer terminal, setup request notification information including originating information when the first setup request message including the originating information is received; and
  transmitting, at the computer terminal, an answer message to the IP terminal when the subscriber answers the first setup request message.

14. The call processing method of claim 11, wherein the packet includes at least one of audio data and video data.

15. A call processing method in a Voice over Internet Protocol (VoIP) system performed by an Internet Protocol (IP) terminal, comprising:
  performing authentication when remote access is requested from a computer terminal over a network;
  converting into relay mode when the authentication is completed and the computer terminal has accessed the IP terminal;
  exchanging a call setup request message for setting up a call between the IP terminal and a counterpart IP terminal, the call setup request message including originating information with a counterpart IP terminal, wherein the originating information is included in a second setup request message received from the computer terminals, such that the IP terminal is set up as one of an originating terminal of the call and a destination terminal of the call and the counterpart IP terminal is set up as another one of the originating terminal of the call and the destination terminal of the call;
  transmitting an answer message to the computer terminal and setting up the call between the IP terminal and the counterpart IP terminal when a call answer message is received from the counterpart IP terminal;
  transmitting a packet, received through the call, to the computer terminal; and
  transmitting a packet, received from the computer terminal, to the counterpart IP terminal through the call,
  wherein the IP terminal transmits a first setup request message including originating information to the computer terminal, wherein a call setup request message received from the counterpart IP terminal includes the originating information, and
  wherein the IP terminal transmits the call setup request message, including destination information, to the counterpart IP terminal when a second setup request message, including the destination information, is received from the computer terminal, and transmits a ring-back message to the computer terminal when a response-for-setup message is received.

16. The call processing method of claim 15, further comprising:
  transmitting a ring-back message including ring-back information to the computer terminal when a response-for-setup message is received from the counterpart IP terminal.

17. A call processing method in a Voice over Internet Protocol (VoIP) system performed by a computer terminal, comprising:
  requesting an Internet Protocol (IP) terminal for remote access over a network in response to a request from a subscriber;
  outputting setup request notification information including originating information, which is included in a first setup request message received from the IP terminal;
  transmitting an answer message to the IP terminal when the subscriber answers the first setup request message;
  transmitting a packet including audio or video data, inputted from the subscriber, to the IP terminal;
  receiving, from the IP terminal, a packet received by the IP terminal through a call between the IP terminal and a counterpart IP terminal that corresponds to the originating information, such that the IP terminal is set up as one of an originating terminal of the call and a destination terminal of the call and the counterpart IP terminal is set up as another one of the originating terminal of the call and the destination terminal of the call; and
  outputting audio or video data included in the packet received from the IP terminal,
  wherein the IP terminal converts into relay mode when the computer terminal has remotely accessed the IP terminal, and transmits a first setup request message including originating information to the computer terminal,
  wherein a call setup request message received from the counterpart IP terminal includes the originating information, and
  wherein the IP terminal transmits a response-for-setup message to the counterpart IP terminal when the call setup request message is received.

18. The call processing method of claim 17, further comprising:
  transmitting a second setup request message, including destination information inputted from the subscriber, to the IP terminal; and
  outputting ring-back information included in a ring-back message received from the IP terminal.

19. The call processing method of claim 17, further comprising:
  outputting an authentication pop-up window when information input is requested from the IP terminal; and
  transmitting information, which is inputted from the subscriber using the authentication pop-up window, to the IP terminal, for enabling authentication.

* * * * *